United States Patent
Hiscock et al.

(10) Patent No.: US 7,463,732 B1
(45) Date of Patent: Dec. 9, 2008

(54) FLEXIBLE DATA OUTLET

(75) Inventors: James S. Hiscock, Rockport, MA (US);
Kiwon Chang, Needham, MA (US);
Floyd Backes, Sharon, NH (US); Myles Kimmit, Shewsbury, MA (US)

(73) Assignee: 3Com Corporation, Marlborough, MA (US)

( * ) Notice: Subject to any disclaimer, the term of this patent is extended or adjusted under 35 U.S.C. 154(b) by 369 days.

(21) Appl. No.: 09/634,185

(22) Filed: Aug. 9, 2000

Related U.S. Application Data

(60) Provisional application No. 60/201,956, filed on May 5, 2000.

(51) Int. Cl.
*H04M 1/00* (2006.01)
*H04M 9/00* (2006.01)

(52) U.S. Cl. ............... 379/399.02; 379/93.05; 379/93.07; 379/380; 379/383; 379/387.02; 379/413.03

(58) Field of Classification Search ............ 379/399.01, 379/413, 413.01, 413.02, 93.05, 93.02, 93.07, 379/93.09, 93.06, 380, 383, 386, 387.01, 379/387.02, 390.04, 399.02, 402, 413.03
See application file for complete search history.

(56) References Cited

U.S. PATENT DOCUMENTS

| | | | | |
|---|---|---|---|---|
| 5,722,076 A | * | 2/1998 | Sakabe et al. | 455/450 |
| 5,743,052 A | * | 4/1998 | Mayhall et al. | 52/36.1 |
| 5,771,349 A | * | 6/1998 | Picazo et al. | 726/21 |
| 5,802,055 A | * | 9/1998 | Krein et al. | 370/402 |
| 5,805,816 A | * | 9/1998 | Picazo et al. | 709/223 |
| 5,807,139 A | * | 9/1998 | Volansky et al. | 439/638 |
| 5,933,775 A | * | 8/1999 | Peters | 455/420 |
| 5,970,069 A | * | 10/1999 | Kumar et al. | 370/402 |
| 5,991,387 A | * | 11/1999 | Shaffer et al. | 379/211 |
| 6,012,951 A | * | 1/2000 | Krawez et al. | 439/620 |
| 6,044,403 A | * | 3/2000 | Gerszberg et al. | 709/225 |
| 6,130,893 A | * | 10/2000 | Whittaker et al. | 370/420 |
| 6,137,866 A | * | 10/2000 | Staber et al. | 379/93.06 |
| 6,167,120 A | * | 12/2000 | Kikinis | 379/90.01 |
| 6,324,178 B1 | * | 11/2001 | Lo et al. | 370/392 |
| 6,400,815 B1 | * | 6/2002 | Gilboy et al. | 379/171 |
| 6,404,764 B1 | * | 6/2002 | Jones et al. | 370/352 |
| 6,483,902 B1 | * | 11/2002 | Stewart et al. | 379/90.01 |
| 6,549,616 B1 | * | 4/2003 | Binder | 379/90.01 |
| 6,661,893 B1 | * | 12/2003 | Vaughn et al. | 379/399.01 |
| 6,690,677 B1 | * | 2/2004 | Binder | 370/465 |

(Continued)

*Primary Examiner*—Binh K Tieu

(57) ABSTRACT

A flexible data outlet includes a housing configured for placement in an operating area of a user, such as on a wall adjacent to a user's work space. User interface circuitry in the housing provides an interface to user equipment located in the user operating area, including a user telephone device and a user data device such as a personal computer. The user interface circuitry includes a link-layer interface to the user data device. Both wired and wireless user connections are supported. Premises interface circuitry in the housing provides an interface to premises equipment located generally outside the user operating area. The premises equipment includes data processing equipment and telephone communications equipment providing access to a public telephone network. Bridge circuitry in the housing provides communications connections between the user interface circuitry and the premises interface circuitry in a flexible manner, enabling the provision of a variety of information services to the user. An optional management processor can provide diagnostic and other information to the user via hypertext pages. The data outlet is packaged in a housing similar to the housing used for a standard telephone wall jack, and is connected to telephone wiring or other available wiring.

12 Claims, 3 Drawing Sheets

U.S. PATENT DOCUMENTS

| | | | |
|---|---|---|---|
| 6,714,534 B1 * | 3/2004 | Gerszberg et al. | 370/352 |
| 6,757,368 B2 * | 6/2004 | Binder | 379/90.01 |
| 6,970,538 B2 * | 11/2005 | Binder | 379/90.01 |
| 2001/0000707 A1 * | 5/2001 | Kikinis | 379/93.01 |
| 2001/0022784 A1 * | 9/2001 | Menon et al. | 370/352 |
| 2003/0018757 A1 * | 1/2003 | Saito et al. | 709/220 |
| 2003/0179868 A1 * | 9/2003 | Binder | 379/90.01 |
| 2004/0165616 A1 * | 8/2004 | Binder | 370/465 |
| 2004/0196835 A1 * | 10/2004 | Binder | 370/352 |
| 2005/0013320 A1 * | 1/2005 | Binder | 370/463 |
| 2005/0105477 A1 * | 5/2005 | Binder | 370/254 |
| 2005/0111636 A1 * | 5/2005 | Binder | 379/93.08 |
| 2005/0117603 A1 * | 6/2005 | Binder | 370/466 |
| 2005/0129069 A1 * | 6/2005 | Binder | 370/493 |
| 2005/0163152 A1 * | 7/2005 | Binder | 370/463 |
| 2005/0226226 A1 * | 10/2005 | Binder | 370/352 |
| 2006/0203981 A1 * | 9/2006 | Binder | 379/90.01 |

* cited by examiner

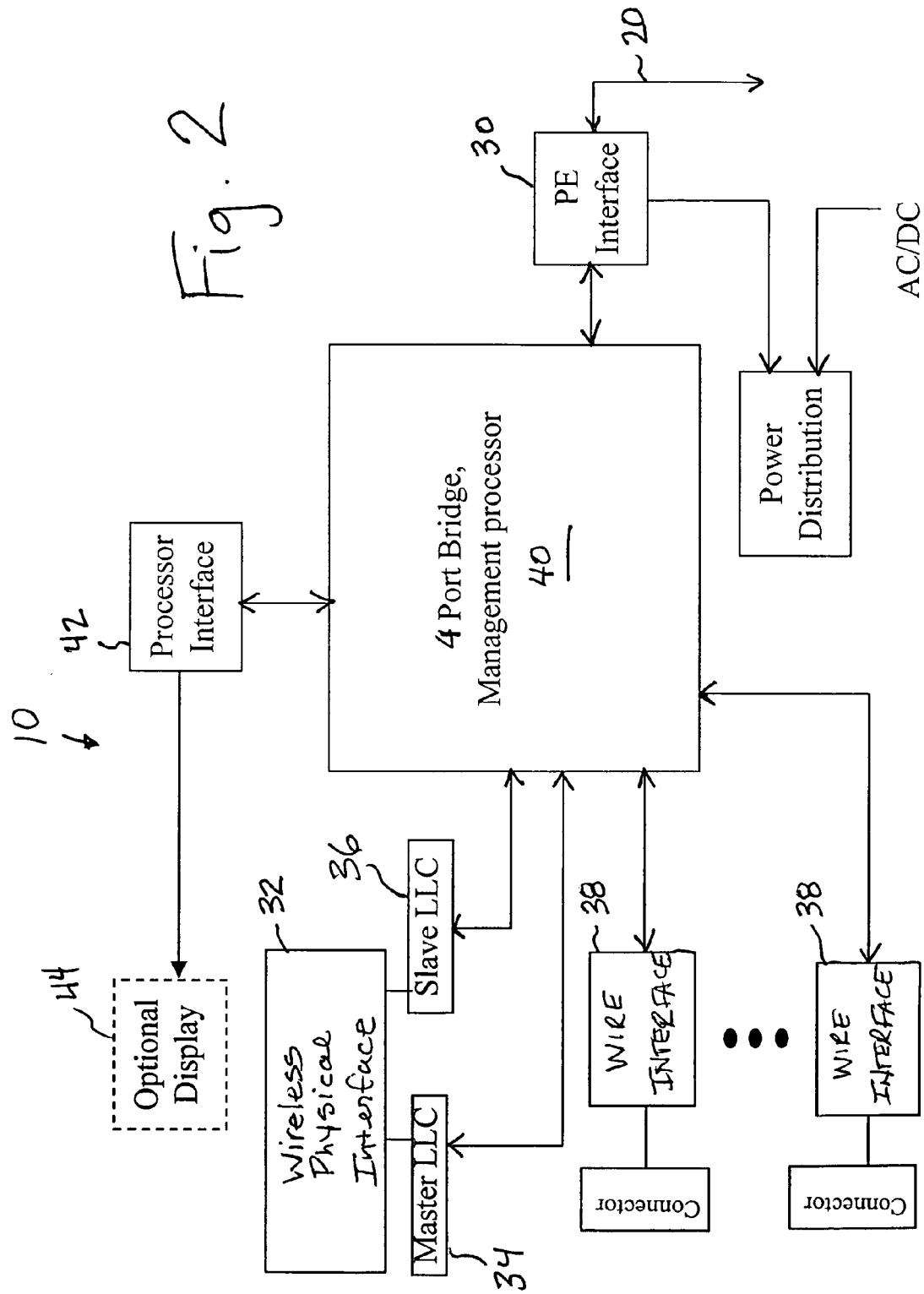

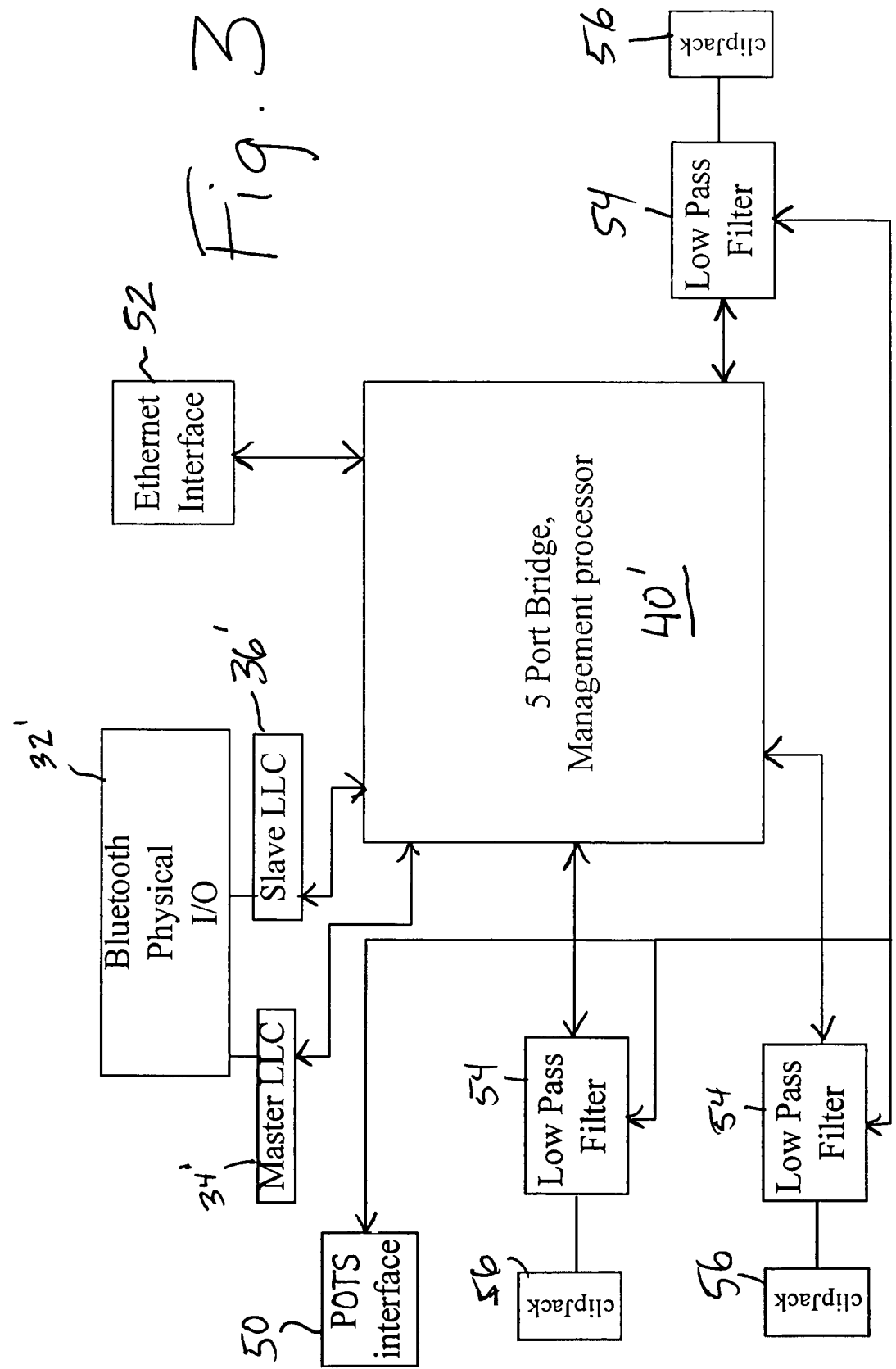

FLEXIBLE DATA OUTLET

CROSS REFERENCE TO RELATED APPLICATIONS

This application claims priority under 35 U.S.C. §119(e) of Provisional Patent Application No. 60/201,956, filed May 5, 2000, entitled "Self Service Data Interface and Flexible Data Outlet".

STATEMENT REGARDING FEDERALLY SPONSORED RESEARCH OR DEVELOPMENT

Not Applicable

BACKGROUND OF THE INVENTION

The present invention is related to the field of interfaces between data users and a data infrastructure such as a computer network in a building or company.

In traditional information technology (IT) installations, the connection between a user, such as an office occupant with a personal computer, and the broader network with its resources such as file servers, printers, etc., is realized by a cable extending between a wall jack in the user's office and centrally-located interface equipment such as multiplexers, switches, or the like. In order for a user to obtain any information about the network and its resources, referred to herein as the "data infrastructure", it is necessary that this connection between the user's computer and the centralized resource be working properly. If the connection to the user is not working, the user is typically required to contact IT maintenance personnel and wait for the problem to be diagnosed and corrected. Such a situation increases the demand on IT support organizations and contributes to decreased user productivity.

Additionally, in many IT installations the functional interface between the data infrastructure and user connection points is very rigidly defined. For example, the interface may operate according to a specific high-level network protocol, such as Novell®, that the user's computer does not support. As a result, a user whose computer does not conform to the functional requirements of the interface, such as a traveling user with a portable computer configured for a different network type, may be unable to connect to the data infrastructure, or may be prevented from making full use of its capabilities.

It is desirable to reduce the demand on IT support resources, and to enable user equipment to more readily interface to data infrastructures having different functional capabilities and requirements.

BRIEF SUMMARY OF THE INVENTION

In accordance with the present invention, a flexible data outlet is disclosed that brings data connectivity and services closer to the user, enabling more widespread use of data services along with greater user self-sufficiency. The outlet is compact and can be used with existing wiring, such as home or office telephone wiring, and thus is readily deployed in any of a variety of environments, such as a home, small office, or areas of a larger building such as a commercial office building or public transportation facility.

In particular, the data outlet includes a housing configured for placement in an operating area of a user, such as on a wall adjacent to a user's work space. User interface circuitry in the housing provides an interface to user equipment generally located in the user operating area, including a user telephone device and a user data device such as a personal computer. The user interface circuitry includes a link-layer interface, such as an Ethernet media access control (MAC) interface, to the user data device.

Premises interface circuitry in the housing provides an interface to premises equipment located generally outside the user operating area. The premises equipment includes data processing equipment as well as telephone communications equipment providing access to a public telephone network. Bridge circuitry in the housing provides communications connections between the user interface circuitry and the premises interface circuitry in a flexible manner, enabling the provision of a variety of information services to the user.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which:

FIG. 2 is a block diagram of the data outlet of FIG. 1 having a first configuration;

FIG. 3 is a block diagram of the data outlet of FIG. 1 having a second configuration;

DETAILED DESCRIPTION OF THE INVENTION

Figure 1:
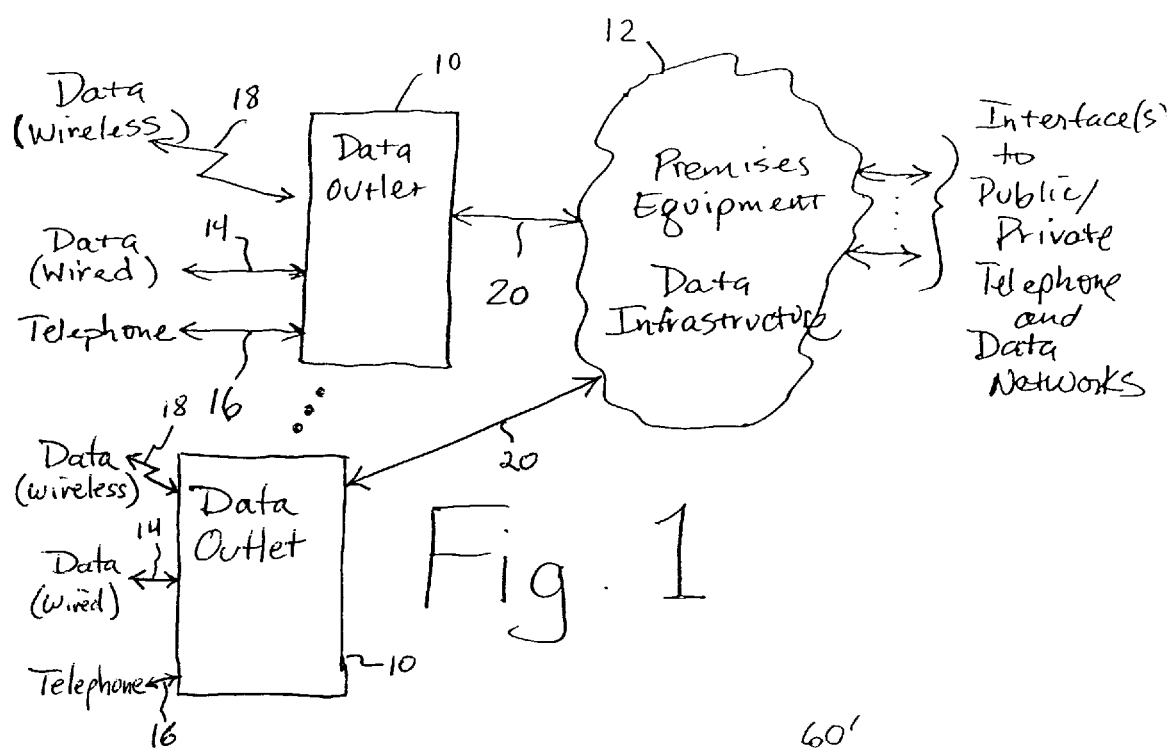
FIG. 1 is a block diagram of a communications system incorporating a data outlet according to the present invention.

In FIG. 1, data outlets 10 provide communications interfaces between user data and/or telephone devices (not shown) and premises equipment 12 located in a building or perhaps a campus of buildings. The collection of premises equipment 12 is also referred to herein as the "data infrastructure". The user devices connect to the data outlets 10 via some combination of wired links and wireless links, such as wired links 14, 16 and wireless link 18 as shown. In FIG. 1, the links 14 and 18 are links to data devices such as personal computers, palmtop computers, etc., and the links 16 are links to telephones, which may be either analog or digital telephones. Although not shown in FIG. 1, the data outlet 10 may also provide wireless links to cellular telephones (not shown) or other personal communication devices.

The premises equipment/data infrastructure 12 may include any of a variety of equipment, ranging from a small number of relatively unsophisticated devices to a much larger number of sophisticated devices. For example, in a home the premises equipment 12 may include interfaces to one or more additional data outlets located elsewhere in the home, a modem to provide access to remote data services, and an interface to the public telephone network. In a slightly more sophisticated configuration, the premises equipment 12 in a home may also include a small local area network (LAN) to which the data outlets 10 are connected, along with a central server computer that provides shared services such as printing, Internet access, file storage and retrieval, etc.

On a larger scale, the system of FIG. 1 may be employed in an office building or campus of buildings, for example, and can include a much larger LAN and numerous LAN devices, such as print servers, file servers, compute servers, communications servers, etc. The equipment 12 may also include or connect to a private branch exchange (PBX) or similar device for providing private telephone service and connections to the public telephone network.

Each data outlet 10 is coupled to the premises equipment/data infrastructure 12 by one or more links 20. For example, a link 20 in a home may employ the home's telephone wiring. A wireless link may be used as well, either alone or in conjunction with a wired link. In a commercial setting, the link 20 may include data cabling such as coaxial cabling, unshielded twisted pair cabling, etc. The communications protocol employed over the link 20 may be one of several types, as described below.

FIG. 2 shows a block diagram of the data outlet 10 in a configuration suitable for commercial deployment. The premises equipment link 20 is connected to premises equipment (PE) interface circuitry 30. The wireless link 18 (FIG. 1) terminates at physical-layer wireless interface circuitry 32, which is associated with master logical link control (LLC) circuitry 34 and slave LLC circuitry 36. One or more of the wired connections 14 (FIG. 1) terminate at wire interfaces 38, each of which includes media access control (MAC) circuitry and physical-layer circuitry (not shown in FIG. 2). Autosense circuitry (not shown) within each interface 38 automatically determines the data rate at which the associated wire link 14 should be operated.

The wireless interface circuitry 32, 34 and 36 preferably operate according to an emerging master-slave wireless communication protocol known by the name "Bluetooth". Alternatively, this circuitry may implement an interface to an infrared (IR) wireless link, or it may be part of a wireless local area network (LAN) operating according to the IEEE 802.11 wireless communication standard.

A 4-port bridge 40 provides link-layer connectivity among the interfaces 30, 34, 36 and 38. Within the bridge 40 may be a management processor (not shown) for performing certain desirable functions, some of which are described below. There may be a separate processor interface 42 to enable external equipment (not shown) to access the management processor. Optional display circuitry 44 may be used to convey status and other information to a user. For example, the display circuitry 44 may consist of several light-emitting diodes (LEDs) or a small liquid crystal display (LCD) panel.

The basic function of the bridge 40 is transferring data packets between the PE link 20 and the various user interfaces 32 and 38, following programmable rules for allocating available communications bandwidth among the different traffic streams. The bridge 40 may also include a range of additional functions, such as data encryption and user authentication. It may be desirable that the wireless interface 32 and one or more wire interfaces 38 be viewed as a redundant set of communication channels, enabling a user to access the premises equipment 12 through one channel even if the other is malfunctioning or otherwise unavailable. For example, in the event that a user's wire connection to an interface 38 is faulty, the user can communicate via the wireless interface 32. On the premises side, the bridge 40 may be capable of determining whether the data rate obtainable using one link 20 to the premises equipment is greater than the data rate that can be obtained by another, and automatically select the link having the higher data rate. In particular, in the event that a wired link 20 is of poor quality, the bridge 40 may choose to employ a wireless link 20 to communicate with the premises equipment 12.

Additionally, "self service" management functions may be provided in order to enhance the user-friendliness of the data infrastructure 12. The optional management processor (not shown) can be programmed to provide such functions. For example, there may be routines for executing diagnostics and communicating status to the user. A diagnostic may detect when there is a faulty wired connection between the data outlet and the user, and inform the user of this situation via the wireless interface 32. These functions may be accessible to a user via a hypertext page stored in the management processor and provided to the user via a standard browser running on the user's personal computer or other data device. In addition to such diagnostic and status functions, this hypertext page may contain links or pointers to other pages within the data infrastructure 12 (FIG. 1) that describe available data services. When the user clicks on such a link, the request is redirected onto the premises link 20, and any response from equipment within the data infrastructure 12 is forwarded to the user data device via the appropriate user interface 32 or 38.

FIG. 3 shows a slightly different version of the data outlet 10 that is suitable for use in a home or small office. As shown, wireless interface components 32', 34' and 36' operate according to the Bluetooth standard. An interface to a standard telephone is provided by "plain old telephone service" (POTS) interface circuitry 50. User data communications occur via an Ethernet interface 52. Three low-pass filters 54 and corresponding "clipjack" connectors 56 provide interfaces to the home or small office cabling, which may be standard telephone wiring. The various interfaces are physically and logically interconnected by a 5-port bridge 40', which may contain a management processor (not shown) as described above.

In an alternative embodiment, the bridge circuitry 40' may implement voice-over-Internet-Protocol (IP) technology. Such a configuration would allow for the connection of digital telephones known as "IP telephones".

Figure 4:
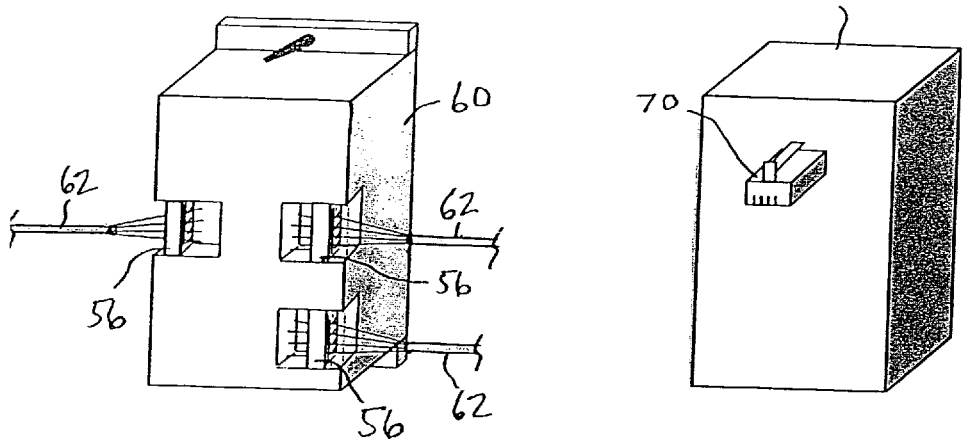
FIG. 4 is a rear perspective view of a first type of housing for the data outlet of FIG. 1.

FIG. 4 shows a rear view of a housing for a version of the data outlet 10 such as shown in FIG. 3. The housing 60 is formed of rigid material in the shape of an outlet box suitable for mounting on a wall in a manner similar to the mounting of conventional telephone jacks. The clipjack connectors 56 terminate standard 4-wire telephone cable 62, and connect to the back of the housing 60 as shown. This configuration is beneficial because it enables proper termination of each segment of the house wiring, enabling higher data transmission rates than is generally available on poorly-terminated wiring.

Figure 5:
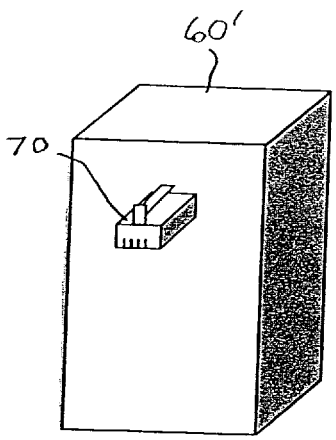
FIG. 5 is a rear perspective view of a second type of housing for the data outlet of FIG. 1.

FIG. 5 shows a rear view of an alternative housing 60' that employs a modular telephone plug 70 to connect to an existing telephone jack. This version has the drawback that it creates a "stub" on the telephone wiring, rather than a well-matched termination as is possible with the housing 60 of FIG. 4, and therefore the maximum data transmission rate on the wiring may be less than that obtainable with the configuration of FIG. 4. However, this version is easily installed by being plugged into an existing telephone jack. This configuration may be suitable for users for whom convenience is important and whose communications needs may be more modest.

In general, it is expected that the data outlet 10 obtains its electrical power directly from the wiring to which it attaches, preferably as direct current (DC). In installations having more than a small number of data outlets, it may be beneficial to employ a power supply to provide this DC power to the wiring from a local power source, such as AC house power. In one embodiment, this DC power supply may itself be packaged in a housing like those of FIG. 4 or FIG. 5, wall mounted at a suitable location, and connected to the installation wiring via a connector such as connectors 56 or 70 via which DC power is supplied to the wiring.

From the perspective of circuit packaging, it may be beneficial to arrange the internal cavity (not shown) of the housing 60 or 60' to accept standard circuit cards such as those conforming to the Personal Computer Memory Card International Association (PCMCIA) standard. In such a case, the data outlet 10 can be configured in a variety of ways, and can be upgraded over time if desired.

A flexible data outlet and certain specific alternative features or arrangements have been described. It will be apparent to those skilled in the art that other modifications to and variations of the disclosed data outlet are possible without departing from the inventive concepts disclosed herein, and therefore the invention should not be viewed as limited except to the full scope and spirit of the appended claims.

What is claimed is:

1. A data outlet, suitable for connecting user-equipment located in a user-operating area with a premises' data infrastructure, the data outlet comprising:
    user interface circuitry providing a plurality of user-data interfaces to said user-equipment,
    premise interface circuitry providing a premise-data interface to said data infrastructure, and
    bridge circuitry providing data packet transfer between said user interface circuitry and said premise interface circuitry; and
    a compact housing that (a) is configured of rigid material and has a rear and a front; (b) encloses said user interface circuitry, said premises interface circuitry, and said bridge circuitry, and (c) is mountable in or on a wall adjacent said user-operating area such that said front provides said plurality of user-data interfaces and said rear provides said premise-data interface.

2. A data outlet according to claim 1, wherein said premise-data interface includes a plug for insertion into a modular.

3. A data outlet according to claim 1, further comprising an analog telephone interface operatively coupled to the bridge circuitry.

4. A data outlet according to claim 1, further comprising a digital telephone interface operatively coupled to the bridge circuitry.

5. A data outlet according to claim 1, further comprising power circuitry operative to received DC power from the data infrastructure or one of the user-data interfaces.

6. A data outlet according to claim 1, further comprising a processor operative to provide at least one high-level service to the user via at least one of the user-data interfaces.

7. A data outlet according to claim 6, wherein the at least one high-level service includes data encryption.

8. A data outlet according to claim 6, wherein the at least one high-level service includes a user authentication.

9. A data outlet according to claim 6, wherein the at least one high-level service includes a diagnostic and status reporting to the user.

10. A data outlet according to claim 9, wherein the diagnostic is operative to detect a problem with a connection between the user-equipment and the data outlet, and wherein the status reporting is operative to notify the user of the detected connection problem.

11. A decentralized computer network according to claim 6, wherein the at least one high-level service includes Voice Over Internet Protocol (VOIP) services.

12. A data outlet according to claim 6, wherein the at least one high level service includes a web service.

* * * * *